US011332846B2

(12) United States Patent
Hwang et al.

(10) Patent No.: US 11,332,846 B2
(45) Date of Patent: May 17, 2022

(54) HAND-HELD CATHODE STRUCTURE AND ELECTROLYTIC-POLISHING APPARATUS INCLUDING THE SAME

(71) Applicant: Jae Sang Hwang, Seoul (KR)

(72) Inventors: Jae Sang Hwang, Seoul (KR); Wan Seob Song, Seoul (KR)

(73) Assignee: Jae Sang Hwang, Seoul (KR)

( * ) Notice: Subject to any disclaimer, the term of this patent is extended or adjusted under 35 U.S.C. 154(b) by 0 days.

(21) Appl. No.: 17/089,620

(22) Filed: Nov. 4, 2020

(65) Prior Publication Data

US 2021/0277536 A1 Sep. 9, 2021

(30) Foreign Application Priority Data

Mar. 9, 2020 (KR) ........................ 10-2020-0029126

(51) Int. Cl.
*C25F 7/00* (2006.01)
*B23H 3/04* (2006.01)
*C25F 3/16* (2006.01)

(52) U.S. Cl.
CPC ................. *C25F 7/00* (2013.01); *B23H 3/04* (2013.01); *C25F 3/16* (2013.01)

(58) Field of Classification Search
CPC ........................................................ B23H 3/04
See application file for complete search history.

(56) References Cited

U.S. PATENT DOCUMENTS 5,571,389 A * 11/1996 Kerampran .............. C25D 5/06 204/224 R
8,647,495 B2 * 2/2014 Aoike ....................... C25F 1/02 205/668
2005/0230267 A1 * 10/2005 Veatch ...................... G21F 9/28 205/687
2010/0326820 A1 * 12/2010 Klower ..................... C25F 7/00 204/224 M

FOREIGN PATENT DOCUMENTS

| | | | |
|---|---|---|---|
| JP | S58117900 | A | 7/1983 |
| JP | H07278899 | A | 10/1995 |
| KR | 1020010103438 | A | 11/2001 |
| KR | 10-1183218 | B | 9/2012 |

* cited by examiner

*Primary Examiner* — Nicholas A Smith
(74) *Attorney, Agent, or Firm* — Loza & Loza, LLP; Heidi Eisenhut

(57) ABSTRACT

The embodiment relates to a hand-held cathode structure and an electrolytic polishing apparatus including the same. The hand-held cathode structure according to the embodiment has a cathode plate structure that is disposed adjacent to an electrolytic polishing target material for an electrolytic polishing, a cathode plate movable with respect to the electrolytic polishing target material, and an insulating fiber coating layer capable of absorbing the electrolyte disposed between the electrolytic polishing target material and the cathode plate.

11 Claims, 7 Drawing Sheets

36
38
103
120 H3 110c 130
D2
D1
T1
50
Z
X Y

HAND-HELD CATHODE STRUCTURE AND ELECTROLYTIC-POLISHING APPARATUS INCLUDING THE SAME

CROSS-REFERENCE TO RELATED APPLICATION

This application claims under 35 U.S.C. § 119 to Korean Patent Application No. 10-2020-0029126 filed Mar. 9, 2020, which is hereby incorporated by reference in its entirety.

TECHNICAL FIELD

The embodiment relates to a hand-held cathode structure and an electrolytic polishing apparatus including the same. The hand-held cathode structure can be a hand-held cathode structure.

BACKGROUND ART

Electrolytic-polishing uses a metal target or a metal product that is dissolved in an electrolyte as an anode, and a metal insoluble in the electrolyte is used as a cathode, and a voltage is applied between the anode and the cathode to apply a metal target to be electrolytic polishing. Electrolytic-polishing is a hand-held cathode structure of polishing the surface of metal targets by electrolysis on the surface of the metal target.

In general, in order to polish the metal target by the electrolytic polishing, an electrolytic bath is filled with an electrolyte, a metal target to be polished is installed as an anode, a metal plate that does not dissolve in the electrolyte is installed as a cathode, and then direct current is applied to the anode and the cathode.

When electrolytic polishing proceeds, a high viscosity liquid layer (viscous layer) containing a large amount of dissolved metal ions from the anode surrounds the electrolytic polishing target material, which is the anode. In the liquid layer saturated with metal ions, since the metal target is no longer dissolved and forms a high anode potential, it is actively combined with oxygen to form an oxide film. At this time, the dissolved metal ions are mainly accumulated in the concave portion of the metal surface, and the movement and diffusion of the metal ions are small in the concave portion, so electricity does not pass well, so the metal target does not dissolve. On the other hand, since the metal ion layer is formed thin in the convex portion of the metal surface of the electrolytic polishing target material, current is concentrated to easily dissolve the metal surface, thereby making the metal surface of the electrolytic polishing target material smooth.

On the other hand, electrolytic polishing is carried out through an electrolytic polishing apparatus. In the electrolytic polishing apparatus according to the related art, an electrolytic polishing target material having an anode potential is placed in an 'electrolytic bath' and a cathode plate is disposed so as to be spaced apart from the polishing surface of the electrolytic polishing target material. Since the cathode plate must be changed according to the shape of the electrolytic polishing target material, it is installed in the electrolytic bath after assembly according to the shape of the electrolytic polishing target material.

The cathode plate assembled as described above is installed in the electrolytic bath so as not to directly contact the electrolytic polishing target material to prevent electrical short circuit. However, the cathode plate must be placed close to the electrolytic polishing target material while maintaining a certain distance to achieve uniform polishing, thereby improving the electrolytic polishing quality.

However, in the related art, the cathode plate was not rigidly disposed to maintain a constant distance close to the electrolytic polishing target material.

Accordingly, the inventor of this application had invented a cathode supporter in a tab hole (or bolt hole) formed in the electrolytic polishing target material, and fixed the cathode plate on the cathode holder uniformly while being insulated from the cathode supporter while being close to one side of the electrolytic polishing target material. This invention had been filed and is registered as a patent (see Korean Patent Registration No. 10-1183218).

In addition, there is a problem that electrolytic polishing objects made of two or more materials such as steel and stainless steel, steel and Inconel, and steel and hasteloid cannot be electrolytically polished by the immersion method. In addition, there is a problem that electrolytic polishing cannot be performed by the immersion method even for a material to be electrolytically polished by cladding a different material on steel.

These electrolytic polishing target materials may require electrolytic polishing only at specific locations other than two or more material areas, but conventional electrolytic polishing proceeds in a state in which the electrolytic polishing target material is entirely immersed in the electrolytic bath, so there is a problem that unnecessary or sensitive areas are also polished.

On the other hand, 'Loose', a discoloration phenomenon, occurs inside tanks or pipes installed and used inside factories where pharmaceutical products, food products, and chemical products are manufactured, or 'rust' occurs due to damage to the passive film. In this case, partial or full electrolytic polishing is required, but it is impossible to proceed with electrolytic polishing by dismantling these tanks or pipes and moving them to an electrolytic polishing plant.

DISCLOSURE

Technical Problem

An object of the embodiment is to provide a hand-held cathode structure capable of electrolytic polishing an electrolytic polishing target material that is difficult to electrolytic polishing by immersion in an electrolytic bath and an electrolytic polishing apparatus including the same.

In addition, an object of the embodiment is to provide a hand-held cathode structure capable of selectively electropolishing only a specific region of an electrolytic polishing target material, and an electrolytic polishing apparatus including the same.

In addition, an object of the embodiment is to provide a hand-held cathode structure capable of electrolytic polishing even when partial or complete electrolytic polishing is required, while it is impossible for the corresponding tank or pipe to be dismantled and moved to an electrolytic polishing plant, and an electrolytic polishing apparatus including the same.

Technical Solution

The hand-held cathode structure according to the embodiment is disposed adjacent to an electrolytic polishing target material for electrolytic polishing.

And the hand-held cathode structure comprises a cathode plate movable with respect to the electrolytic polishing target material and an insulating fiber film layer disposed between the electrolytic polishing target material and the cathode plate and capable of absorbing an electrolyte.

The insulating fiber coating layer comprises a first insulating fiber coating layer disposed between the electrolytic polishing target material and the cathode plate, a second insulating fiber coating layer surrounding a side surface of the cathode plate, and a third insulating fiber coating layer surrounding an upper side of the cathode plate.

The cathode plate includes a vertical perforation penetrating upper and lower sides.

A second diameter of the upper side of the vertical perforation is larger than a first diameter of the lower side of the vertical perforation.

The hand-held cathode structure further comprises a horizontal perforation connected to the vertical perforation and extending in a horizontal direction to pass therethrough.

The insulating fiber coating layer includes a predetermined recess and in which an electrolyte nozzle is fixed to the predetermined recess.

The cathode plate comprises a curved shape.

An electrolytic polishing apparatus comprises the hand-held cathode structure.

Advantageous Effects

The hand-held cathode structure and the electrolytic polishing apparatus including the same according to the embodiment have a technical effect of electrolytic polishing an electrolytic polishing target material that is difficult to electrolytic polishing by immersion in an electrolytic bath.

For example, according to the hand-held cathode structure according to the embodiment, when the electrolyte is supplied to the insulating fiber film layer in a state disposed close to the electrolytic polishing target material, the electrolytic polishing can be precisely performed while the insulating fiber film layer contains the electrolyte. Therefore, there is a special technical effect that can electrolytically polish the electrolytic polishing target material, which is difficult to electrolytic polishing by immersion.

In addition, the embodiment has a technical effect of selectively electropolishing only a specific area of an electrolytic polishing target material.

For example, according to the hand-held cathode structure according to the embodiment, the cathode plate can be moved up and down and left and right with respect to the electrolytic polishing object material while the insulating fiber film layer contains the electrolyte in a state that is placed close to the electrolytic polishing target material. Since electrolytic polishing is in progress, there is a special technical effect of selectively and precisely electropolishing only a specific area of the electrolytic polishing target material.

In addition, according to the embodiment, the electrolyte can be smoothly supplied to the insulating fiber film layer by vertical perforations provided in the cathode plate, and bubbles generated by electrolytic polishing can be well discharged, thereby remarkably improving electrolytic polishing performance.

In addition, the embodiment has a technical effect that electrolytic polishing is possible even when the electrolytic polishing operation cannot be carried out by dismantling the corresponding tank or pipe and moving to the electrolytic polishing plant although partial or complete electrolytic polishing is required.

DETAILED DESCRIPTION OF THE EMBODIMENTS

Hereinafter, exemplary embodiments will be described in detail with reference to the drawings.

Figure 1:
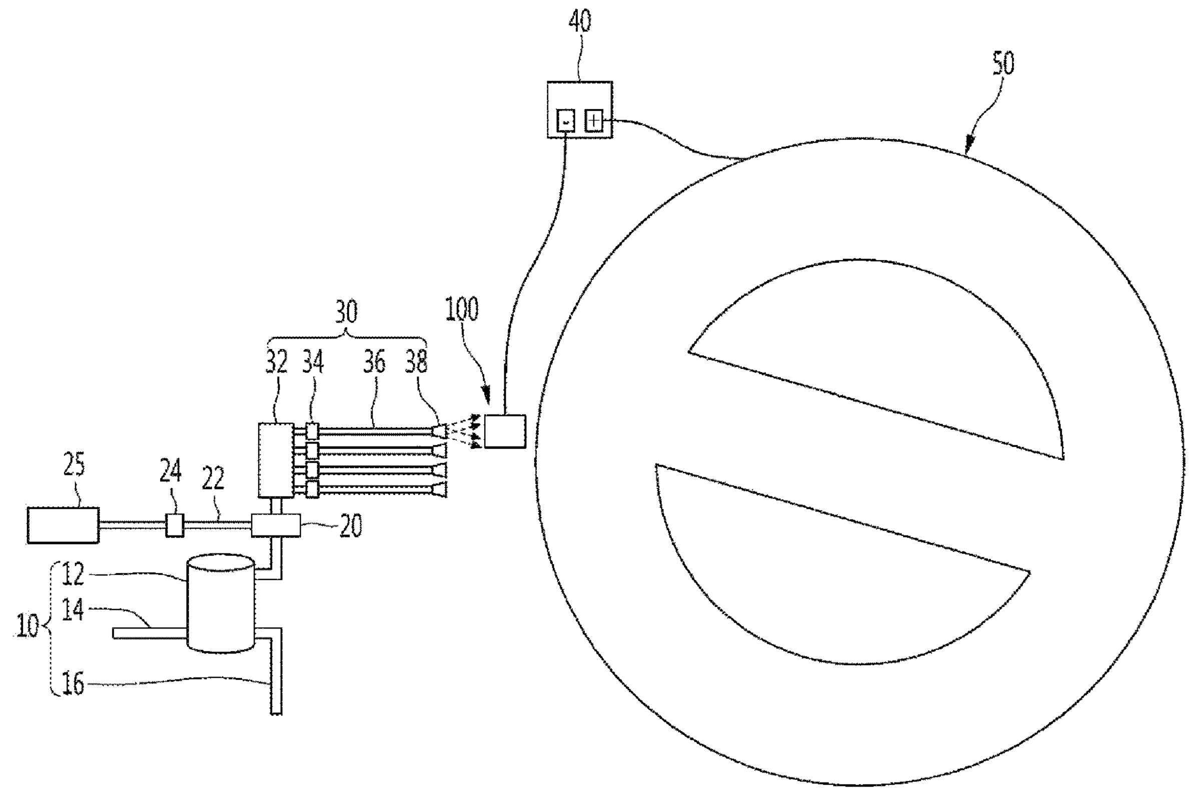
FIG. 1 is a conceptual diagram of an electrolytic polishing apparatus including a hand-held cathode structure according to an embodiment.

FIG. 1 is a conceptual diagram of an electrolytic polishing apparatus including a hand-held cathode structure 100 according to an embodiment.

The electrolytic polishing apparatus according to the embodiment may include an electrolyte tank device 10, an electrolyte solution distribution device 30, a hand-held cathode structure 100, and a rectifier 40.

The electrolytic polishing target material 50 electrolytically polished using the electrolytic polishing apparatus according to the embodiment may be a polygonal or cylindrical chamber or tank, and the weight thereof is in some cases ranging from hundreds of kg to hundreds of thousands of kg (hundreds of tons). For example, the electrolytic polishing target material 50 to which the embodiment is applied may be a reactor tank or the like, but is not limited thereto.

In an embodiment, the electrolyte tank device 10 may include an electrolyte tank 12 for accommodating an electrolyte, an electrolyte supply line 16 and an air pump line 14. The electrolyte tank device 10 may include an electrolyte heating device (not shown).

In the embodiment, the electrolyte distribution device 30 may include an electrolyte distributor 32, an electrolyte control valve 34, an electrolyte supply hose 36, and an electrolyte nozzle 38. An air pump 20 or a metering pump can be disposed between the electrolyte distributor 32 and the electrolyte tank 12 to smoothly distribute and supply the electrolyte.

An air hose 22 and an air regulator 24 that receive air from an air compressor 25 are installed in the air pump 20 to adjust the amount of an electrolyte pump to an appropriate amount.

In addition, in an embodiment, the electrolyte flowing from the electrolyte nozzle 38 and the hand-held cathode structure 100 during electropolishing is collected in an electrolyte recovery container (not shown) and sent to the electrolyte tank 12 through an electrolyte return pump (not shown) for reuse. As the electrolyte return pump, an air pump or the like can be used.

The rectifier 40 may include a cathode and an anode lead wire, and may apply anode power to the electrolytic polishing target material 50 and cathode power to the hand-held cathode structure 100.

One of the technical problems of the embodiment is to provide a hand-held cathode structure capable of electrolytic polishing an electrolytic polishing target material that is difficult to electrolytic polishing by an immersion method in an electrolytic bath, and an electrolytic polishing apparatus including the same.

In addition, one of the technical problems of the embodiment is to provide a hand-held cathode structure capable of selectively electropolishing only a specific area of an electrolytic polishing target material, and an electrolytic polishing apparatus including the same.

Hereinafter, a hand-held cathode and an electrolytic polishing apparatus including the same according to an embodiment for solving the above technical problem will be described in detail with reference to the drawings.

Figure 2:
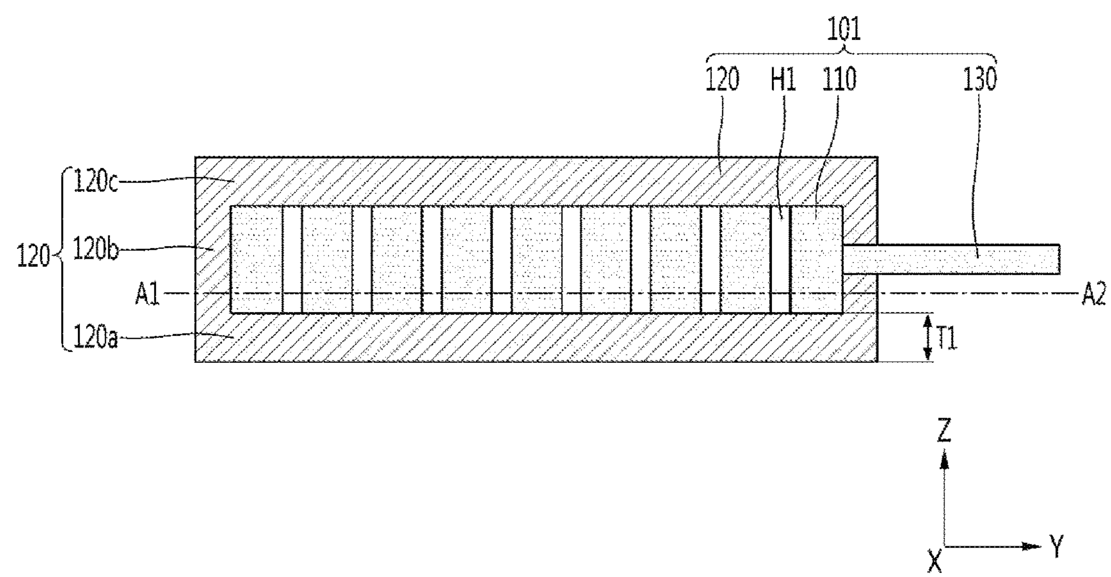
FIG. 2 is a cross-sectional view of a hand-held cathode structure according to the first embodiment.
Figure 3:
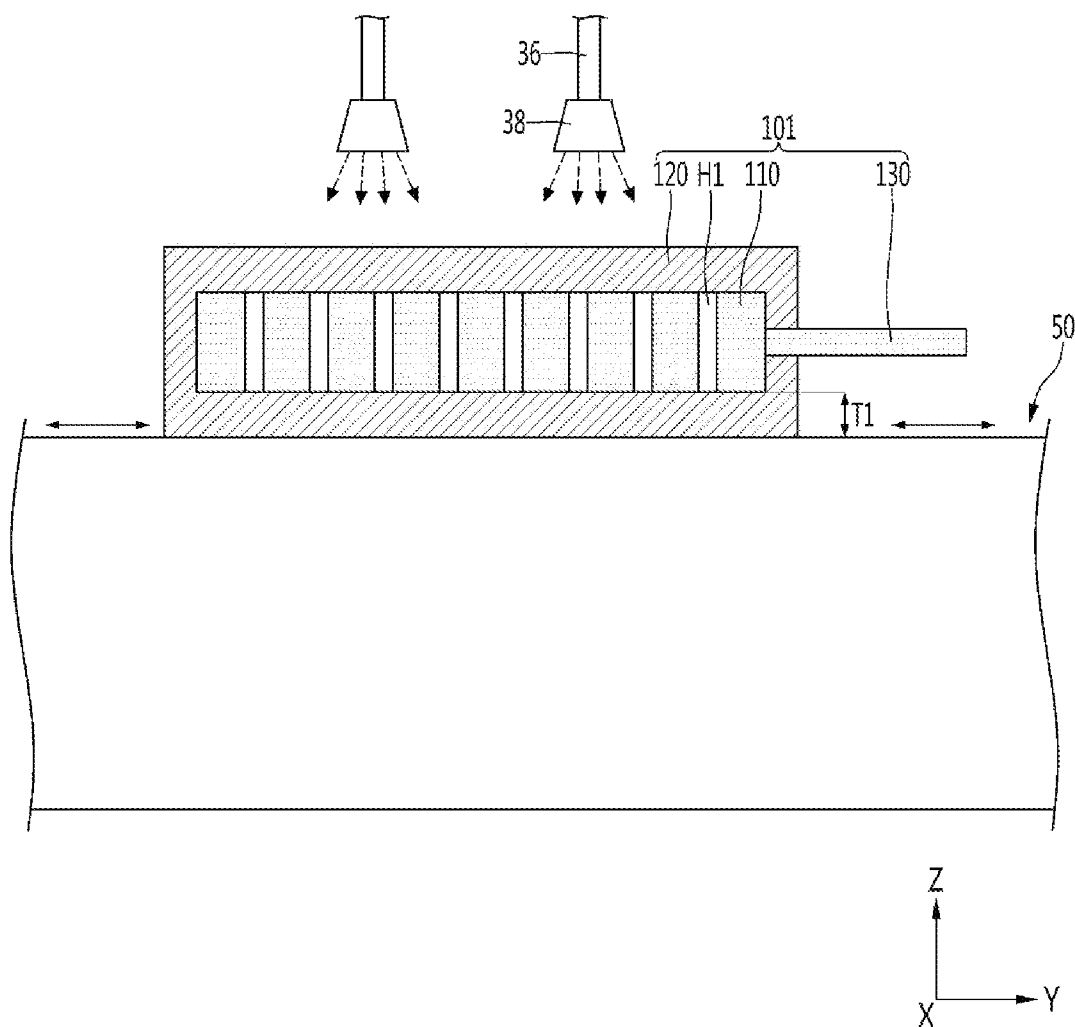
FIG. 3 is an exemplary view of an electrolytic polishing operation including a hand-held cathode structure according to the first embodiment.

FIG. 2 is a cross-sectional view of the hand-held cathode structure 101 according to the first embodiment, and FIG. 3 is an exemplary view of an electrolytic polishing operation including the hand-held cathode structure 101 according to the first embodiment. In the coordinate axis illustrated in FIG. 2, the Z axis may be an axis perpendicular to the ground (XY plane), but is not limited thereto.

First, referring to FIG. 3, the hand-held cathode structure 101 according to the first embodiment may include a cathode plate 110 disposed adjacent to the electrolytic polishing object material 50 so that the electrolytic polishing proceeds and an insulating fiber coating layer 120 disposed between the electrolytic polishing target material 50 and the cathode plate 110, while the insulating fiber coating layer 120 capable of absorbing an electrolyte.

According to the hand-held cathode structure 101 according to the embodiment, when an electrolyte is supplied to the insulating fiber film layer 120 in a state disposed close to the electrolytic polishing target material 50, the insulating fiber film layer 120 is electrolyzed in a state containing the electrolyte. Since the polishing can be carried out precisely, there is a special technical effect that can electrolytically polish the electrolytic polishing target material that is difficult to electrolytic polishing by the immersion method.

In addition, according to the hand-held cathode structure 101 according to the embodiment, the cathode plate 110 is attached to the electrolytic polishing object material in a state in which the insulating fiber coating layer 120 contains the electrolyte solution in a state that is disposed close to the electrolytic polishing object material 50. On the other hand, since electrolytic polishing proceeds while being movable vertically and horizontally, there is a special technical effect of selectively and precisely electropolishing only a specific area of the electrolytic polishing target material.

Referring back to FIG. 2, in the first embodiment, the cathode plate 110 may be formed of an electrically conductive material. For example, the cathode plate 110 may be made of a copper plate, aluminum, or stainless steel with strong acid resistance, but is not limited thereto.

The cathode plate 110 may have a plate shape, but is not limited thereto, and may be a bar shape, a rectangular shape, a rod shape, a round shape, a wire mesh shape, an expanded shape plate, etc.

A handle 130 is disposed on one side of the cathode plate 110 to increase work efficiency. The circumference of the handle 130 may be electrically insulated with a film layer made of an insulating material such as PVC, rubber, or urethane rubber.

In the first embodiment, the insulating fiber coating layer 120 is disposed between the electrolytic polishing target material 50 and the cathode electrode plate 110 and may absorb and contain an electrolyte.

The insulating fiber coating layer 120 may be glass fiber, vectran, polyester nylon blended yarn, urethane fiber, or the like, but is not limited thereto.

The insulating fiber coating layer 120 includes a first insulating fiber coating layer 120*a* disposed between the electropolishing target material 50 and the cathode electrode plate 110, a second insulating fiber coating layer 120*b* surrounding the side surface of the cathode electrode plate 110, and a third insulating fiber coating layer 120*c* surrounding the upper side of the cathode plate 110.

The insulating fiber coating layer 120 may include at least the first insulating fiber coating layer 120*a*, and the second insulating fiber coating layer 120*b* and the third insulating fiber coating layer 120*c*.

The thickness T1 of the first insulating fiber coating layer 120*a* may be a thickness capable of sufficiently containing an electrolyte in one or more layers.

In addition, the thickness T1 of the first insulating fiber coating layer 120*a* may be about 1 to 10 mm, and through this, the distance between the electrolytic polishing target material 50 and the cathode electrode plate 110 can be optimally electropolished. As the electrolytic polishing target material 50 is uniformly spaced apart from each other so that it can proceed, the electrolytic polishing efficiency is improved and the electrolytic polishing quality may be very excellent.

In an embodiment, the cathode plate 110 may include vertical perforations H1 penetrating the upper side and the lower side.

According to the embodiment, the electrolyte can be smoothly supplied to the insulating fiber film layer 120 by the vertical perforation H1 provided in the cathode plate 110, and the air bubbles generated by the electrolytic polishing are well discharged, so that there are special technical effects that the electrolytic polishing performance can be significantly improved.

Hereinafter, an electrolytic polishing operation including the hand-held cathode structure 101 according to the first embodiment will be described with reference to FIGS. 1 and 3.

Referring to FIG. 1, after setting the electrolyte in the electrolyte tank 12 to a temperature to be heated, the power of the electrolyte heating heater is turned on.

Thereafter, the area of the electrolytic polishing target material 50 that is not an electrolytic polishing area is sealed with a polyethylene (PE) film and a masking tape.

Next, the cathode lead wire of the rectifier 40 is connected to the hand-held cathode structure 100 and fixed with a C-type clamp, and the positive lead wire is connected to the electrolytic polishing target material 50 and fixed with a C-type clamp or the like.

Refereeing to FIGS. 1 and 3 together, the electrolyte supply hose 36 is positioned on or connected to the hand-held cathode structure 100, the air pump 20 is turned on, and the control valve 34 of the electrolyte distributor 32 is turned on to adjust the electrolyte supply amount to an appropriate amount.

As shown in FIG. 3, the electrolyte may be sprayed onto the hand-held cathode structure 101 by the electrolyte supply hose 36 and the electrolyte nozzle 38. The electrolyte may be formed by mixing at least one material selected from the group consisting of distilled water ($H_2O$), sulfuric acid ($H_2SO_4$), phosphoric acid ($H_3PO_4$), chromic acid, sodium nitrate ($NaNO_3$), sodium chloride (NaCl), and glycerin, it is not limited to thereto.

According to the hand-held cathode structure 101 according to the embodiment, when an electrolyte is supplied to the insulating fiber film layer 120 in a state disposed close to the electrolytic polishing target material 50, the insulating fiber film layer 120 is electrolyzed in a state containing the electrolyte. Since the polishing can be carried out precisely, there is a special technical effect that can electrolytically polish the electrolytic polishing target material that is difficult to electrolytic polishing by the immersion method.

Next, the power of the rectifier is turned on, the ammeter is adjusted to a predetermined voltage or current, and then the hand-held cathode structures 100 and 101 are gradually moved back and forth or left and right, and electrolytic polishing is performed for a predetermined time.

Next, when electrolytic polishing is completed, the electrolytic polishing target material 50 may be cleaned and a drying process may be performed.

According to the hand-held cathode structure 101 according to the embodiment, in a state in which the insulating fiber coating layer 120 contains an electrolyte solution in a state that the cathode plate 110 is disposed close to the electrolytic polishing object material 50. Since electrolytic polishing is performed while being movable up and down, left and right, there is a special technical effect of selectively and precisely electropolishing only a specific area of the electrolytic polishing target material.

In addition, according to the embodiment, the electrolyte can be smoothly supplied to the insulating fiber film layer 120 by the vertical perforations H1 provided in the cathode plate 110, and the air bubbles generated by the electrolytic polishing are well discharged and thus there is a technical effect that electrolytic polishing can significantly improve performance.

Figure 4A:
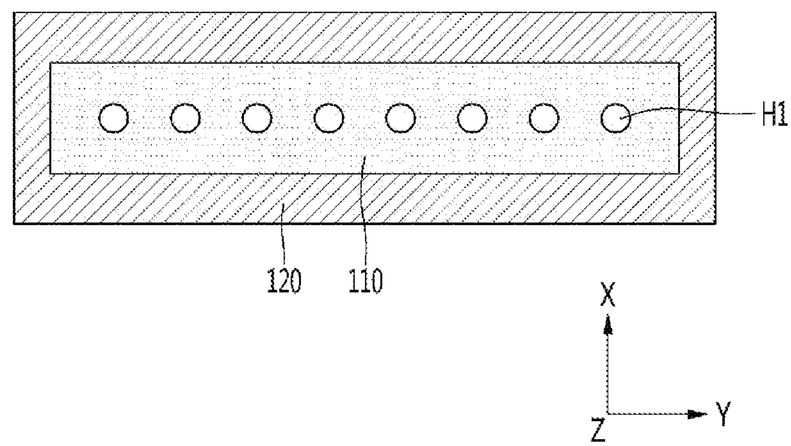
FIG. 4A is a first plan view of a hand-held cathode structure according to the first embodiment.
Figure 4B:
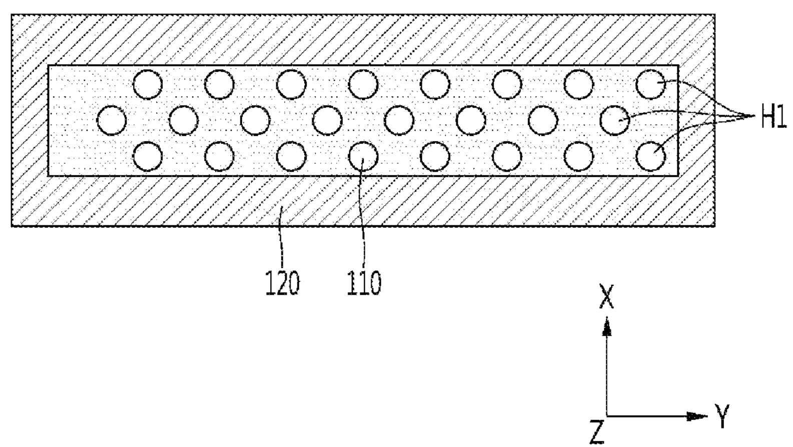
FIG. 4B is a second plan view of the hand-held cathode structure according to the first embodiment.
Figure 4C:
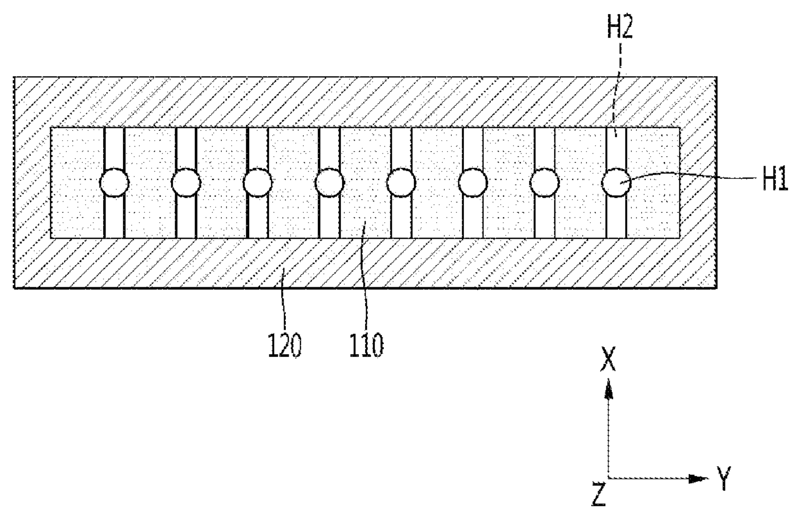
FIG. 4C is a third plan view of the hand-held cathode structure according to the first embodiment.

Next, FIG. 4A is a first plan view 101A of a hand-held cathode structure according to the first embodiment, FIG. 4B is a second plan view 101B of the hand-held cathode structure according to the first embodiment, and FIG. 4C is a first embodiment. It is a third plan view 101C of the hand-held cathode structure according to an example.

FIGS. 4A to 4C are plan views of the hand-held cathode structure in FIG. 2 horizontally cut along the line A1-A2.

Referring to FIG. 4A, the hand-held cathode structure 101A according to the first embodiment may include vertical perforations H1 penetrating the upper and lower sides of the cathode electrode plate 110.

The vertical perforations H1 shown in FIG. 4A may be arranged in one row in the Y-axis direction.

According to the embodiment, the electrolyte can be smoothly supplied to the insulating fiber film layer 120 by the vertical perforation H1 provided in the cathode plate 110, and the air bubbles generated by the electrolytic polishing are well discharged, so that the electrolytic polishing performance can be significantly improved.

Next, referring to FIG. 4B, the hand-held cathode structure 101B according to the first embodiment may include vertical perforations H1 penetrating the upper and lower sides of the cathode plate 110. The vertical perforations H1 shown in FIG. 4B may be arranged in three rows in the Y-axis direction.

The hand-held cathode structure 101B according to the first embodiment has vertical perforations H1 arranged in a plurality of rows, so that the supply of the electrolyte solution or the discharge of air bubbles may be more smoothly performed.

Next, referring to FIG. 4C, the hand-held cathode structure 101C according to the first embodiment may include a vertical perforated hole H1 penetrating the upper and lower sides of the cathode plate 110 and may include a horizontal perforated hole H2 connected to the vertical perforated hole H1 and extending in the direction and penetrating therethrough.

The hand-held cathode structure 101C according to the first embodiment has vertical perforations H1 and horizontal perforations H2, so that the supply of electrolyte or discharge of air bubbles may be more smoothly performed.

For example, since the hand-held cathode structure 101C has vertical perforations (H1) as well as horizontal perforations (H2), the electrolytic polishing process is performed by more efficiently supplying the electrolyte to the side and bottom directions of the insulating fiber film layer 120. The quality of the product can be improved, and the quality of electrolytic polishing can be improved by allowing the exhaust gas discharged from the bottom surface to be discharged to the vertical hole (H1) and the horizontal hole (H2).

Figure 5A:
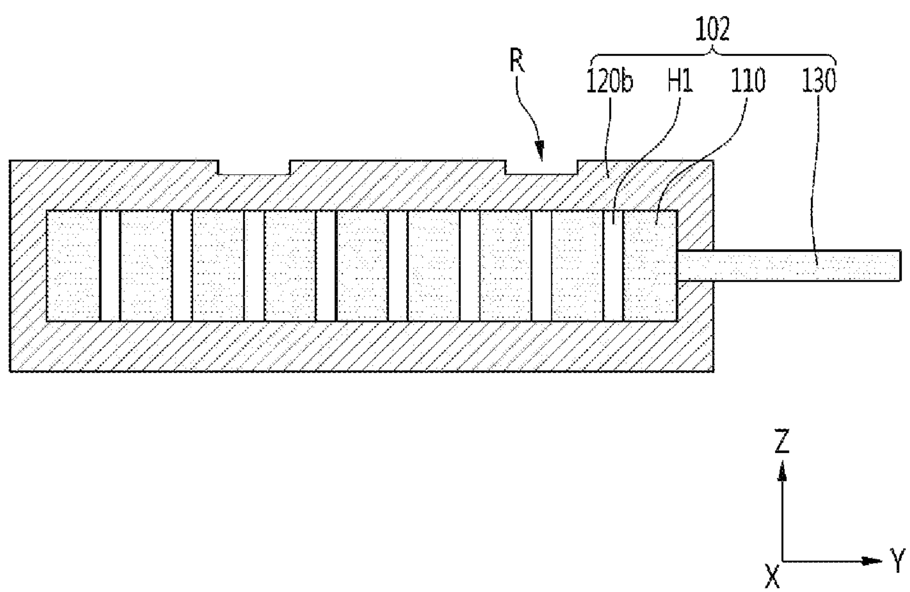
FIG. 5A is a plan view of a hand-held cathode structure according to a second embodiment.
Figure 5B:
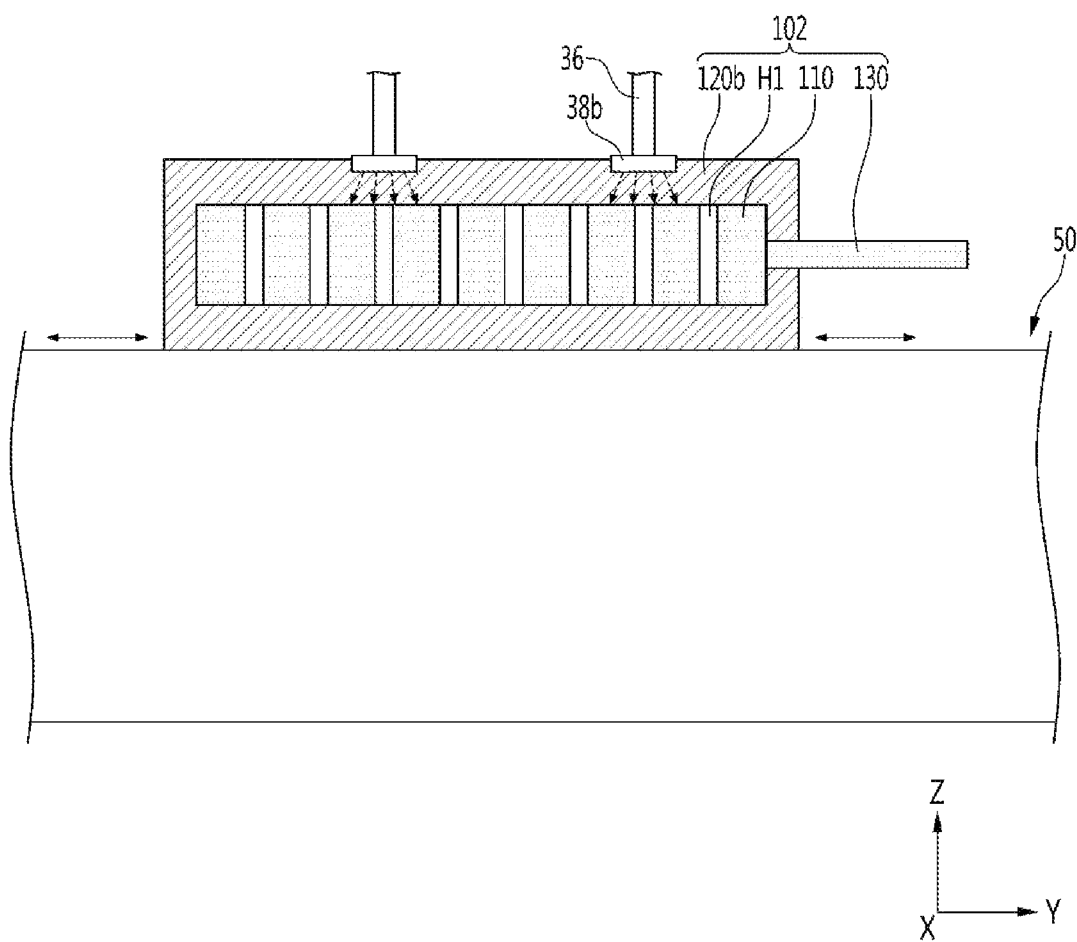
FIG. 5B is an exemplary view of an electrolytic polishing operation including a hand-held cathode structure according to a second embodiment.

Next, FIG. 5A is a plan view of the hand-held cathode structure 102 according to the second embodiment, and FIG. 5B is an exemplary view of an electrolytic polishing operation including the hand-held cathode structure 102 according to the second embodiment.

The second embodiment can adopt the technical features of the first embodiment, and the main features of the second embodiment will be described below.

In the second embodiment, the second insulating fiber coating layer 120*b* may include a predetermined recess R on the upper side.

Referring to FIG. 5B, a second electrolyte nozzle 38*b* may be disposed in the recess R of the second insulating fiber coating layer 120*b* and may be fixed by a predetermined fixing means.

Accordingly, since the second electrolyte nozzle 38*b* can be fixedly disposed on the second insulating fiber film layer 120*b*, a single worker can smoothly perform the electrolytic polishing operation without needing to spray the electrolyte by a separate worker.

In addition, since the second electrolyte nozzle 38*b* can be fixedly disposed on the second insulating fiber film layer 120*b*, the electrolyte supply and spraying are accurately and smoothly controlled only by the control of the electrolyte distributor 32 so that the electrolyte is transferred to the second insulating fiber film layer 120*b* and can be supplied to improve the efficiency of electrolytic polishing and electrolytic polishing quality.

Figure 6:
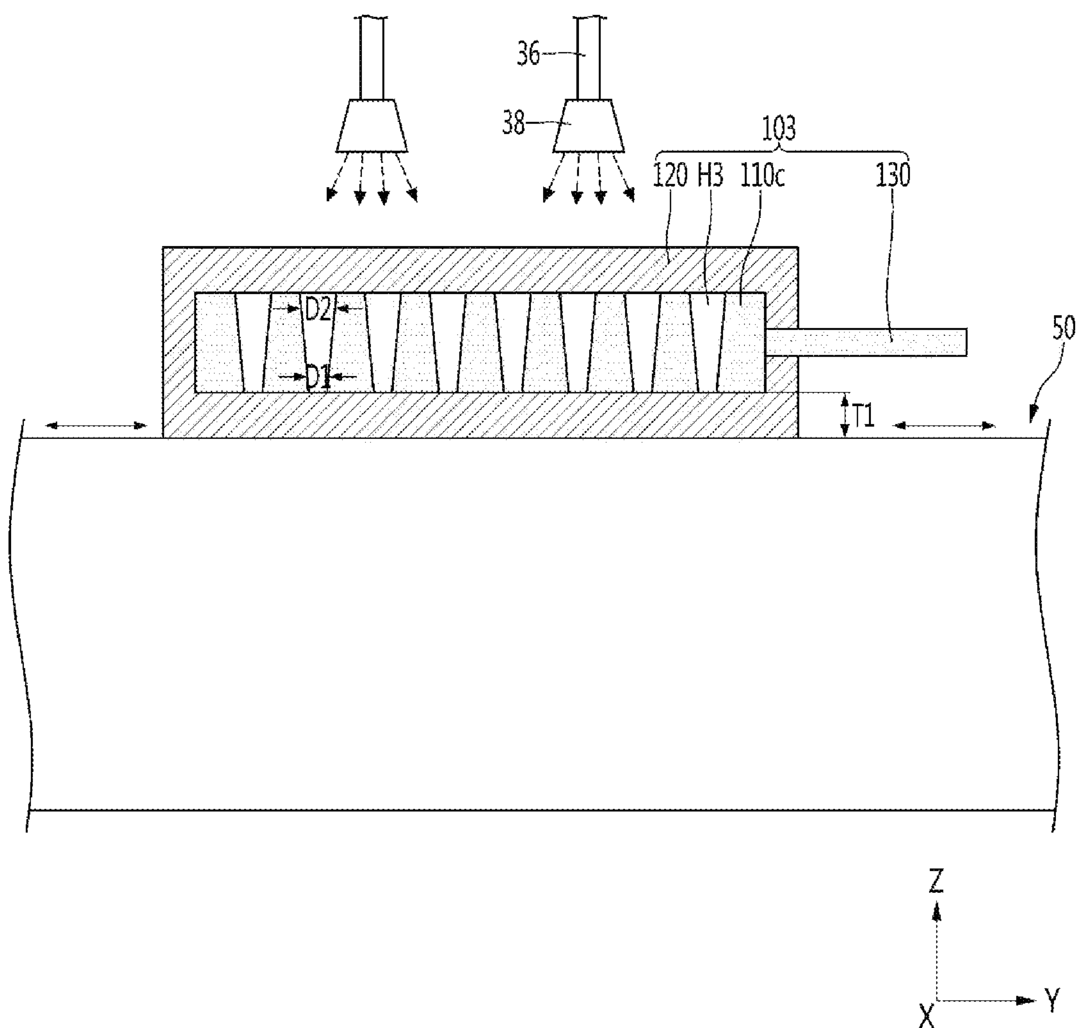
FIG. 6 is an exemplary view of an electrolytic polishing operation including a hand-held cathode structure according to a third embodiment.

FIG. 6 is a diagram illustrating an electrolytic polishing operation including the hand-held cathode structure 103 according to the third embodiment.

The third embodiment may adopt the technical features of the first and second embodiments, and the main features of the third embodiment will be described below.

In the third embodiment, the lower first diameter D1 of the third vertical perforated hole H3 of the third cathode plate 110*c* may be different from the upper second diameter D2.

For example, in the third embodiment, the second diameter D2 on the upper side is greater than the first diameter D1 on the lower side of the third vertical perforation H3 of the third cathode electrode plate 110c.

According to the third embodiment, the second diameter D2 of the third vertical perforated hole H3 at the upper side, which is the area receiving the electrolyte solution, is greater than the first diameter D1 at the lower side, so that the third cathode electrode plate 110c, and at the same time, by controlling the lower first diameter (D1) to be small, it functions to properly hold the electrolyte, so that the electrolyte does not escape too easily, and the electrolyte is properly supplied such that there is a special technical effect that allows efficient electrolytic polishing to proceed.

Figure 7:
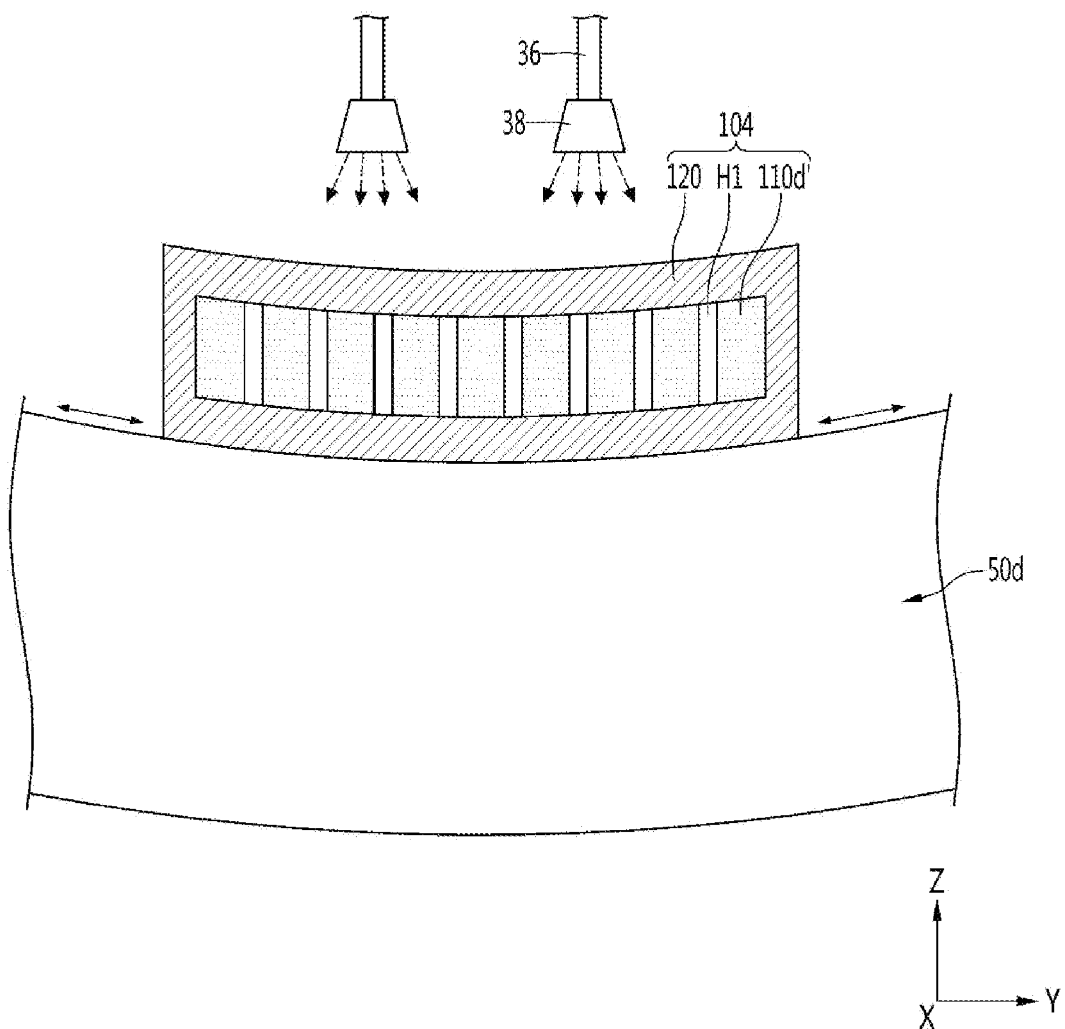
FIG. 7 is an exemplary view of an electrolytic polishing operation including a hand-held cathode structure according to a fourth embodiment.

Next, FIG. 7 is an exemplary view of an electrolytic polishing operation including the hand-held cathode structure 104 according to the fourth embodiment.

The fourth embodiment may employ the technical features of the first to third embodiments, and the main features of the fourth embodiment will be described below.

The fourth cathode plate 110d in the fourth embodiment is characterized in that it has a non-flat curved shape.

As the fourth cathode electrode plate 110d has a curved shape, an accurate electrolytic polishing process may be possible even when the fourth electrolytic polishing target material 50d has a curved surface.

According to the hand-held cathode structure 104 according to the fourth embodiment, the fourth cathode plate 110d has a curved shape in a state in which the insulating fiber coating layer 120 contains an electrolyte solution in a state that is disposed close to the electrolytic polishing target material 50. As provided, there is a special technical effect of selectively and precisely electropolishing only a specific area such as a curved area or a complex area of an electrolytic polishing target material.

In addition, in an embodiment, the fourth cathode plate 110d may be flexible. In an embodiment, the fourth cathode plate 110d may be of a variable type. For example, the fourth cathode plate 110d may have a wire mesh shape, but is not limited thereto.

According to the hand-held cathode structure 104 according to the fourth embodiment, the fourth cathode plate 110d is of variable type in a state in which the insulating fiber film layer contains the electrolyte in a state in which it is placed close to the electrolytic polishing target material 50. There is a special technical effect of selectively and precisely electropolishing only a specific area such as a complex area of an object to be polished.

Although described above with reference to the drawings and embodiments, those skilled in the art will understand that the embodiments can be variously modified and changed without departing from the technical spirit of the embodiments described in the following claims.

The invention claimed is:

1. A hand-held cathode structure which is disposed adjacent to an electrolytic polishing target material for electrolytic polishing, the hand-held cathode structure comprising:

a cathode plate movable with respect to the electrolytic polishing target material; and an insulating fiber coating layer disposed between the electrolytic polishing target material and the cathode plate and capable of absorbing an electrolyte;

wherein the cathode plate includes a vertical perforation penetrating upper and lower sides; and wherein a second diameter of the upper side of the vertical perforation is larger than a first diameter of the lower side of the vertical perforation.

2. The hand-held cathode structure of claim 1, wherein the cathode plate comprises a curved shape.

3. The hand-held cathode structure of claim 1, wherein the hand-held cathode structure is part of an electrolytic polishing apparatus.

4. The hand-held cathode structure of claim 1, wherein the insulating fiber coating layer comprises a first insulating fiber coating layer disposed between the electrolytic polishing target material and the cathode plate, a second insulating fiber coating layer surrounding a side surface of the cathode plate, and a third insulating fiber coating layer surrounding an upper side of the cathode plate.

5. The hand-held cathode structure of claim 4, wherein the hand-held cathode structure is part of an electrolytic polishing apparatus.

6. A hand-held cathode structure, disposed adjacent to an electrolytic polishing target material for electrolytic polishing, the hand-held cathode structure, comprising:

a cathode plate movable with respect to the electrolytic polishing target material; and an insulating fiber coating layer disposed between the electrolytic polishing target material and the cathode plate and capable of absorbing an electrolyte;

wherein the cathode plate includes a vertical perforation penetrating upper and lower sides; and wherein the hand-held cathode structure further comprises a horizontal perforation connected to the vertical perforation and extending in a horizontal direction to pass therethrough.

7. The hand-held cathode structure of claim 6, wherein the cathode plate comprises a curved shape.

8. The hand-held cathode structure of claim 6, wherein the hand-held cathode structure is part of an electrolytic polishing apparatus.

9. A hand-held cathode structure, disposed adjacent to an electrolytic polishing target material for electrolytic polishing, the hand-held cathode structure, comprising:

a cathode plate movable with respect to the electrolytic polishing target material;

and an insulating fiber coating layer disposed between the electrolytic polishing target material and the cathode plate and capable of absorbing an electrolyte;

wherein the insulating fiber coating layer includes a predetermined recess and in which an electrolyte nozzle is fixed to the predetermined recess.

10. The hand-held cathode structure of claim 9, wherein the cathode plate comprises a curved shape.

11. The hand-held cathode structure of claim 9, wherein the hand-held cathode structure is part of an electrolytic polishing apparatus.

* * * * *